United States Patent [19]

Mulder et al.

[11] Patent Number: 5,472,927
[45] Date of Patent: Dec. 5, 1995

[54] CATALYST OR MEMBRANE PRECURSOR SYSTEMS, CATALYST OR MEMBRANE SYSTEMS, AND METHOD OF PREPARING SUCH SYSTEMS

[75] Inventors: Aletta Mulder; Francien van Looy, both of Utrecht; John W. Geus, Bilthoven, all of Netherlands

[73] Assignees: Gastec N. V., Apeldoorn; Nederlandse Organisatie Voor toegepast-natuurwetenschappelijk Onderzoek Tno, 's-Gravenhage, both of Netherlands

[21] Appl. No.: 98,320

[22] PCT Filed: Feb. 6, 1992

[86] PCT No.: PCT/NL92/00028

§ 371 Date: Sep. 30, 1993

§ 102(e) Date: Sep. 30, 1993

[87] PCT Pub. No.: WO92/13637

PCT Pub. Date: Aug. 20, 1992

[30] Foreign Application Priority Data

Feb. 6, 1991 [NL] Netherlands ............... 9100210

[51] Int. Cl.$^6$ ..................................... B01J 21/08
[52] U.S. Cl. ............ 502/439; 502/238; 502/263; 502/304; 502/349; 502/350
[58] Field of Search ................... 502/158, 238, 502/263, 439, 304, 349, 350

[56] References Cited

U.S. PATENT DOCUMENTS

| | | | |
|---|---|---|---|
| 4,132,668 | 1/1979 | Gryaznov et al. ............ | 502/4 |
| 4,157,313 | 6/1979 | Conan et al. ............ | 502/158 |
| 4,242,227 | 12/1980 | Nestrick et al. ............ | 502/401 |
| 4,465,886 | 8/1984 | Rodewald ............ | 585/467 |
| 4,547,486 | 10/1985 | Shyr ............ | 502/333 |
| 4,605,450 | 8/1986 | Thomas et al. ............ | 427/491 |
| 4,970,184 | 11/1990 | Schauss et al. ............ | 502/111 |
| 5,162,407 | 11/1992 | Turner ............ | 524/108 |
| 5,367,099 | 11/1994 | Beck et al. ............ | 585/475 |
| 5,406,015 | 4/1995 | Beck et al. ............ | 585/475 |

FOREIGN PATENT DOCUMENTS

| | | |
|---|---|---|
| 0054158 | 6/1982 | European Pat. Off. . |
| 0080929 | 6/1983 | European Pat. Off. . |
| 0190883 | 8/1986 | European Pat. Off. . |
| 0262962 | 4/1988 | European Pat. Off. . |
| 2710277 | 9/1978 | Germany . |

*Primary Examiner*—Anthony McFarland
*Attorney, Agent, or Firm*—Weingarten, Schurgin, Gagnebin & Hayes

[57] ABSTRACT

A catalyst or membrane system comprising a thermostable, high porous layer applied on a less porous or nonporous support layer, in particular on the inner surface of a monolith or sintered metal body, in the inner pores of α-alumina, of a carbon carrrier or on the surface of a ceramic membrane. The catalyst system can be prepared by spreading a solution of a metallo-organic compound on the inner surface of the support layer and then converting the organometallic compound into the oxide. In the high-porous layer thus obtained, a catalytically active material can be applied in the conventional manner.

18 Claims, 3 Drawing Sheets

CATALYST OR MEMBRANE PRECURSOR SYSTEMS, CATALYST OR MEMBRANE SYSTEMS, AND METHOD OF PREPARING SUCH SYSTEMS

FIELD OF THE INVENTION

This invention relates to a catalyst or membrane precursor system and a catalyst or membrane system as well as a method for preparing such systems.

DESCRIPTION OF THE PRIOR ART

In an increasing number of catalytic processes, catalysts are used which are composed of monoliths having catalytic material applied on their surface. Monoliths as referred to herein are ceramic or metallic bodies having such—relatively low—porosity that they offer a relatively low flow resistance to gases flowing through. The best known applications of monoliths are found in the catalytic purification of the exhaust gases of motor vehicles and in the catalytic purification of flue gases. In those applications, particularly monoliths prepared from ceramic materials are used, the channels in this ceramic material generally having a honeycomb structure. In particular in the selective catalytic reduction of nitrogen oxides in flue gas with ammonia, ceramic monoliths are generally used.

A drawback of such ceramic structures, however, is the minor mechanical strength and the low thermal conductivity thereof. Therefore, monoliths prepared from metal are sometimes used. These are typically prepared by rolling up a metal plate provided with ridges or the like and welding together the contact surfaces thus obtained. Although metal monoliths are relatively expensive, the use thereof is attractive, considering the high mechanical strength and the high heat conductivity in the purification of exhaust gases of motor vehicles, in particular more expensive ones.

In addition to finding application in the purification of flue gas and exhaust gas, monoliths can advantageously be used in other catalytic processes, in particular where it is significant to maintain a low pressure drop.

It is difficult to apply catalytic material on the wall of the internal channels in the monoliths in the desired manner and to the desired extent. Because the catalytic activity is proportional to the active surface per unit volume of the catalyst, small to extremely small particles of the active, catalyzing material are desirable. This applies in particular to the use of precious metals because when they are used, it is desirable to have as many metal atoms on the surface of the internal channels as is possible, also in view of the high cost price.

At the temperatures at which catalysts are thermally pretreated and/or used, however, small particles of most active materials sinter fast. This involves a strong reduction of the active surface and leads to a considerable decrease of the catalytic activity. To avoid this problem, the catalytically active component is generally applied on a so-called carrier, i.e., a thermostable, high-porous solid material which is usually not catalytically active itself. Known carriers include aluminium oxide, silicon oxide and activated carbon. The catalytically active particles are applied on the carrier in such a manner that they are not in mutual contact. By thus applying the catalytically active particles on a carrier, sintering of those particles is generally prevented.

When applying catalytically active components on the surface of the channels in monoliths, one generally starts from small particles, for instance of an average particle size of 100 μm, of a suitable carrier material, on which the active component is applied. According to a suitable technique, a suspension is made of the loaded carrier particles in a suitable liquid. Then the monolith is dipped in this suspension, whereafter the monolith is allowed to drip clean. This method is known as the so-called "dip-coating method". In the technical production of monolith-catalysts, this dip-coating is usually carried out by robots. Studies of catalysts thus prepared demonstrate that the distribution of the loaded carrier particles over the surface of the internal channels of the monoliths is far from being homogeneous. It has also been found that the density of the loaded carrier particles present on the surface is often low. This is a great disadvantage because a high density of uniformly distributed particles over the surface in question is crucial for obtaining a sufficiently high catalytic activity.

Generally, current catalyst systems have a relatively low thermal conductivity. Because many catalytic reactions also involve a large positive or negative heat effect, insufficient supply or discharge of the reaction heat often leads to problems. Partly in this connection, it has previously been proposed to prepare the reactor from porous sintered metal. According to one of those proposals, a porous sintered metal body is sintered together with the wall of the reactor. Not only does a catalytic reactor thus prepared exhibit excellent heat conductivity, particularly to and via the reactor wall, but also the flow pattern of the reactants through the sintered metal body connected to the reactor wall is very favourable because short-circuit flow along the reactor wall—a great disadvantage in the use of current, fixed catalyst beds—does not occur here. Thus, reactors of shorter length than is usual will suffice.

There are methods known for applying catalytically active components on the internal surface of reactor elements consisting of sintered metal. According to one of the most suitable of those methods, the viscosity of a suspension of loaded carrier particles is controlled during the drying of the suspension. Although relatively good results are thus obtained, it is not possible to thereby obtain a very dense and uniform distribution of loaded carrier particles over the internal surface. To obtain a good thermal contact of the catalyst particles via the carrier via the metal, the carrier particles must be in intimate contact with the metal. When applying the loaded carrier particles according to the prior art method described hereinabove, it appears that this contact with the metal cannot be properly controlled.

SUMMARY OF THE INVENTION

According to one aspect of the invention, a catalyst-precursor system is provided, wherein a thermostable, high-porous layer is applied on a less porous or nonporous (support) layer. According to this objective, in particular a catalyst-precursor is provided wherein a dense and uniform layer of a high-porous, thermostable material is applied on the inner surface of a monolith or sintered metal body.

According to another aspect of the invention, a catalyst system is provided which comprises a thermostable, high-porous layer applied on the inner surface of a monolith or sintered metal body or such system, wherein a uniform and very dense distribution of catalytically active material is present in the high-porous layer. Such a catalyst not only has the advantage of an unconventionally high and homogeneous distribution of the catalytically active material in the high-porous layer, but also has the advantage of an excellent thermal contact of the catalytically active (metal) particles with the reactor wall.

According to a particular aspect of the invention, a catalyst-precursor system or catalyst system is provided, wherein a thermostable, dense and very homogeneous, high-porous layer of a metal oxide for silicon oxide, but preferably silicon oxide is present on the inner surface of a carrier and specifically of a monolith or sintered metal body.

BRIEF DESCRIPTION OF THE DRAWINGS

The invention will be more fully understood from the following detailed description taken in conjunction with the accompanying drawings in which.

DETAILED DESCRIPTION OF THE INVENTION

Figure 1:
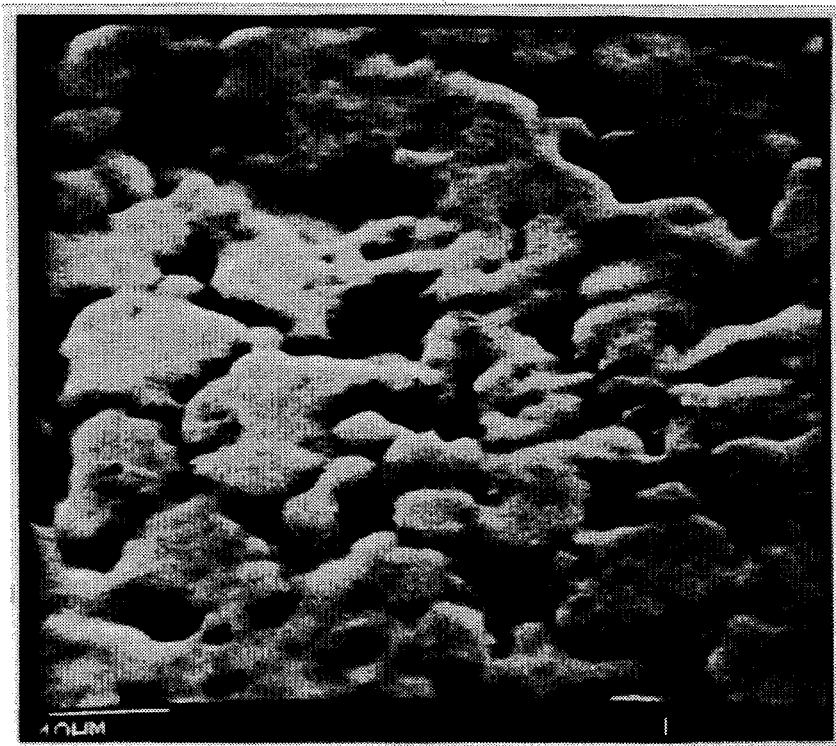
FIG. 1 is a scanning electron micrograph (SEM) image of a fine-porous silica layer formed from silicone rubber on a coarse porous metal sublayer.
Figure 2:
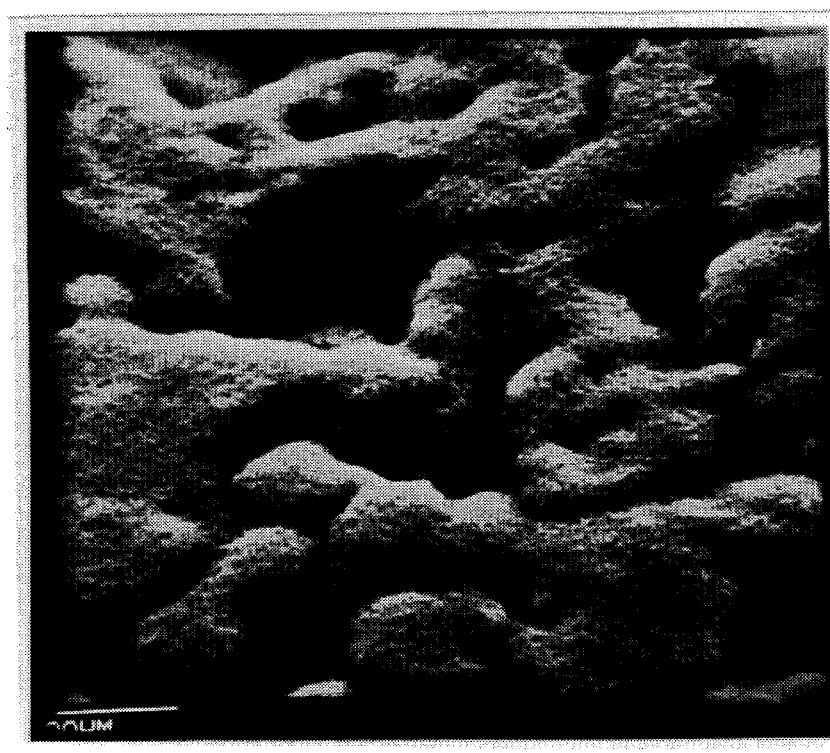
FIG. 2 is another scanning electron micrograph (SEM) image of a fine-porous silica layer formed from silicone rubber on a coarse porous metal sublayer.
Figure 3:
FIG. 3 is a scanning electron micrograph of a fine-porous silica layer to which an extremely thin top layer is applied using the sol-gel process.
Figure 4:
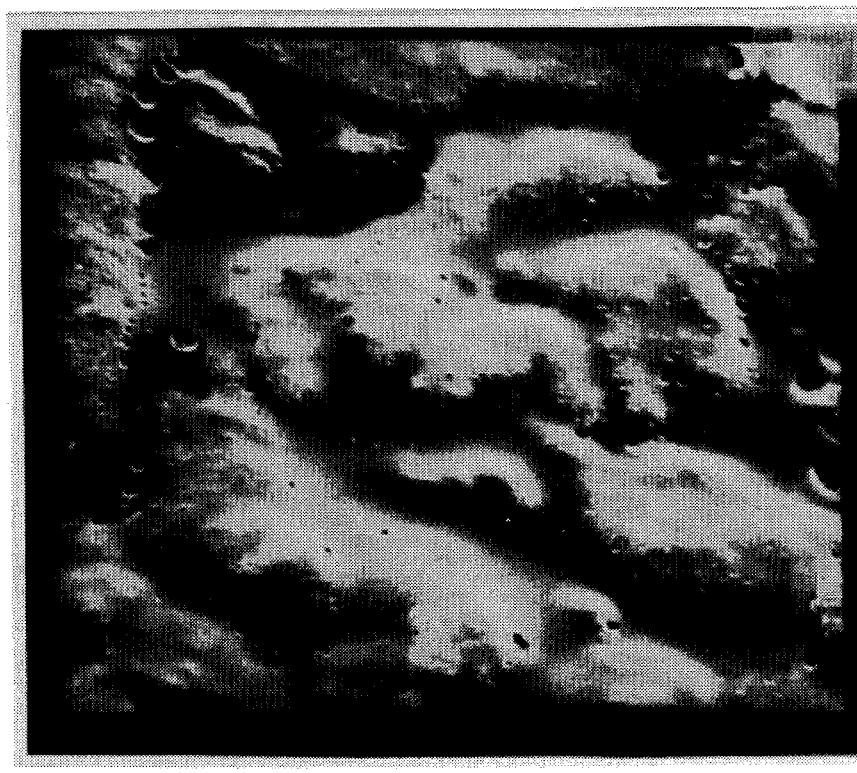
FIG. 4 is another scanning electron micrograph of a fine-porous silica layer to which an extremely thin top layer is applied using the sol-gel process.
Figure 5:
FIG. 5 is a scanning electron micrograph of the inner side of a carrier with a silica layer applied thereon.

As stated above, the systems according to the invention have the advantage that regardless of the spatial structure of the carrier body a very dense and homogeneous distribution of catalytically active particles can be provided in the high-porous layer applied on the carrier body, which catalytically active particles are also in good heat contact with the carrier body. There are thus obtained catalysts whose properties are superior to those of the known catalysts as described above. Because in a relatively large number of catalytic reactions the carrier metal either itself exhibits undesirable catalytic reactions or is attacked, the additional advantage is obtained that in the systems according to the invention these problems do not occur because the (inner) surface of the carrier is fully covered with a dense metal oxide layer.

When using solid catalysts, the thermal conductivity of the catalyst and the mechanical properties of the catalyst bodies can often be increased by using low-porous carrier bodies. A very suitable carrier material is aluminium oxide whose specific surface area is 10 m²/g or less. The low surface of α-aluminium oxide, however, is a great disadvantage because this limits the catalytic activity very much. In the systems according to the invention this problem does not occur because in this system a dense and homogeneous layer of a metal oxide, in particular silicon oxide, with a specific surface area much higher than that of the aluminium oxide, is applied, optionally in tablet form, in the inner pores of aluminium oxide. When subsequently catalytically active material, in particular catalytically active metal particles, is applied in the pores of that silicon oxide while using one of the many methods suitable for this purpose, a catalyst is provided having the good thermal conductivity of α-aluminium oxide carriers, but with a surprisingly much higher activity.

According to an embodiment of the invention the systems do not contain a metal carrier, but a carbon carrier. Although the mechanical stability of carbon is excellent at very high temperatures, carbon will rapidly react with oxygen and steam at higher temperatures. For this reason, despite the aforesaid good properties, carbon is almost never applicable at higher temperatures as a catalyst carrier. In the systems according to the invention carbon can be excellently used as a carrier material because, as a result of the metal oxide—in particular silica—layer applied, which layer is dense and firmly bonded to the surface, a chemically inert carrier material is obtained having excellent heat conductivity properties.

The invention not only relates to catalyst systems and catalytic applications, but also to ceramic membranes. Furthermore, the invention also relates to ceramic membranes, wherein the separation function is combined with a catalytic function applied in or on the membrane.

In principle, any known technique is suitable for applying the aforesaid oxide layers.

According to a method preferably used the catalyst-precursor systems or the catalyst systems according to the invention are prepared by spreading a solution of a suitable metallo-organic compound of—in particular boron, silicon, titanium, zirconium, cerium, scandium or yttrium—on the (inner) surface, removing the solvent by drying and then converting the organometallic compound into the corresponding oxide in an oxidizing medium. The organometallic compound preferably used is a polysiloxane, e.g. as described in Encyclopedia of Science and Technology, McGraw-Hill Book Company, New York, 1982, pages 414, 415, 764 ff., or in Ullmanns Encyklopädie der technischen Chemie, Volume 13 (1977), page 628 ff. A very suitable polysiloxane compound is the silicone rubber SCS 2211 sold by General Electric Company of Waterford, N.Y.

In the method according to the invention the organometallic compound, and in particular the polysiloxane compound, is advantageously dissolved in an anhydrous solvent, e.g. in ethyl acetate, xylene or n-octane. Subsequently, the carrier body is impregnated, preferably after a preceding evacuation of the body to be impregnated. Then the body thus impregnated is air-dried, preferably at a temperature of 60° C., after which the temperature is gradually raised, in particular at a rate of 5° C./min., to 400° C. and maintained at this temperature for at least three hours, followed by cooling gradually, and in particular at a rate of 5° C./min., to room temperature. The organometallic compound, in particular the polysiloxane compound, is oxidized by this treatment, and a high-porous layer of metal oxide, in particular silicon dioxide, remains on the porous or nonporous carrier body surface.

In the method according to the invention the chemical composition of the high-porous coating layer to be applied may be varied within broad limits. Thus, for instance, other elements may be added, if desired, to the solution of the metallo-organic, in particular the polysiloxane compound, preferably in the form of a compound or solution miscible with the solution of the organometallic compound.

The method according to the invention and the systems obtained using this method have a number of important advantages. The viscosity of the applied organometallic layer, and in particular polysiloxane, has been found so high, or so adjustable by a proper selection and concentration of the solvent, that no migration of the solution applied takes place after the impregnation and in the following drying process. In general, migration of the solution will lead to a strongly inhomogeneous distribution of that solution over the inner surface of the body to be coated and thus to a later inhomogeneous oxide layer, which subsequently results in an undesirable inhomogeneous coating with catalytically active material.

It has been found that the method according to the invention gives an excellent bonding of the organometallic layer, in particular the polysiloxane layer, to the (inner) surface of a metal carrier body and, partly as a consequence thereof, after the thermal oxidation of that layer, an excellently bonded, high-porous oxide layer. This is of paramount importance because this ensures a proper heat transfer from the later applied catalytic metal particles to the reactor wall.

It has further been found that the method according to the invention leads to very dense and homogeneous metal oxide layers, in particular silicon oxide layers, applied on carrier surfaces, which layers additionally exhibit an highly accessible surface. A measurement according to the known BET method showed that a silica layer applied using the method according to the invention had a specific surface area above 200 $m^2/g$ silica.

According to a previously proposed method (cf Dutch patent application 9000417) (extremely) fine-porous ceramic layers are applied in or on coarse-porous sublayers. According to the method described a fine-porous layer is applied using a so-called sol-gel method to the surface of a liquid immiscible with the liquid of the sol and having a density exceeding that of the liquid of the sol. The surface of the immiscible liquid can be applied in the pores of a coarse-porous sublayer; thus the (extremely) fine-porous layer is deposited in the pores of the coarse-porous sublayer. When the immiscible liquid fills the pores of the coarse-porous sublayer just completely, the fine-porous layer is formed on the coarse-porous sublayer. Both with ceramic and with metallic coarse-porous sublayers good membranes are obtained using the method described. In this connection particularly the small thickness of the (extremely) fine-porous layer is attractive because this leads to high (separation) rates. However, when the method according to the invention is used, even better results are obtained.

As stated above, (extremely) fine-porous layers can be applied to coarse-porous sublayers using the method according to the invention, while obtaining systems suitable for use as ceramic membranes. In this case a high-viscous solution of a polysiloxane, in particular of a silicone rubber, is preferably spread over the porous sublayer. The viscosity of the solution is adjusted in such a manner that the silicone rubber does not appreciably penetrate into the pores of the coarse-porous sublayer. For the purpose of spreading over larger surfaces the equipment suitably used may be as developed for the production of photographic films and magnetic information carriers.

According to a preferred embodiment of this method the pores of the coarse-porous sublayer are wholly or partly filled with water. Subsequently, a solution of silicone rubber having a relatively low viscosity is spread over the surface of the coarse-porous sublayer. Upon contact with water the silicone rubber will cure. When the pores are partly filled with water, the desired thin layer of fine-porous material is formed in the pores. When the pores are wholly filled with water, a continuous layer of fine-porous material is formed on the porous sublayer.

From the catalyst-precursor systems according to the invention ready catalysts can be prepared using a method suitable for this purpose by applying the catalytically active material in the pores of the oxide layer. Suitable methods are known to those skilled in the art and described inter alia in "Catalytic Combustion of Methane in Fixed-Bed Reactors" by A.Q.M. Boon, Dissertation State University of Utrecht, 1990 and in "Preparation and Properties of Thermostable Alumina-supported Copper Catalysts", IIM Tyburg, Dissertation State University of Utrecht (1989).

The invention will further be illustrated by the following Examples.

EXAMPLE 1

For the preparation of a ceramic membrane a solution of silicone rubber (General Electric SCS 2211) in ethyl acetate (80 g/l) was applied to a coarse-porous metallic sublayer (RVS type 316L), using a method as described in Dutch patent application 9000417. The pores of the sublayer were temporarily filled with a liquid having a density (water or 1,1,1-trichloroethane) higher than the silicone solution to be applied. When this liquid just filled the pores of the coarse-porous sublayer, a measured amount (80 ml) of the silicone solution was poured over the metal surface. The low-viscous solution spread over the metal surface and formed a uniform layer. The solvent was removed by evaporation, and when the pores were filled with trichloroethane, it dissolved therein, and the silicone rubber cured upon contact with water (vapour). Subsequently, the organometallic compound was converted into silica in an oxidizing medium, when the temperature was raised to 400° C. at a rate of 5° C./min. and was maintained at this temperature for 3 hours. The Scanning Electron Microscope (SEM) picture shows a ceramic membrane prepared by this process. Holes or cracks in the membrane can be filled with silica by repeating this process or by means of Chemical vapour Deposition (CVD) and related techniques. Photographs 1 and 2 show, under different magnifications, SEM pictures of a fine-porous silica layer thus formed from silicone rubber on a coarse-porous metal sublayer. The pore sizes in the silica layer were found to be approximately 4 nm.

EXAMPLE 2

A high-viscous solution of the silicone rubber used according to Example 1 (600 g in 1l ethyl acetate) was spread over the coarse-porous metal surface by means of equipment as used for the production of photographic films. After air-curing this continuous layer, the same process was followed as in Example 1.

EXAMPLE 3

Fine-porous layers on coarse-porous sublayers prepared according to Examples 1 and 2 were modified in different ways and for different purposes.

The pores of the ceramic membrane thus obtained were further reduced by using the sol-gel process as described in Dutch patent application 9000417. For this purpose an extremely thin top layer was applied on the surface by applying an acid catalyzed silica sol obtained from tetraethyl orthosilicate (TEOS) by the process described in Example 1 and allowing it to gel.

Photographs 3 and 4 show, under different magnifications, a SEM picture of a fine-porous silica layer obtained according to Example 2, to which an extremely thin top layer is applied using the above described sol-gel process.

The pores of the fine-porous ceramic layers applied to the coarse-porous sublayer according to Examples 1 and 2 could be enlarged by a hydrothermal treatment of the resulting membranes

EXAMPLE 4

The ceramic layers on a coarse-porous sublayer, obtained using the method according to Examples 1–3, were made catalytically active by applying impregnation or homogeneous deposition precipitation (as described in "Catalytic Combustion of Methane in Fixed-Bed Reactors" by A.Q.M. Boon, Dissertation State University of Utrecht, 1990, and "Preparation and Properties of Thermostable Alumina-supported Copper Catalysts", I. I. M. Tyburg, Dissertation State University of Utrecht, 1989) of a precursor solution of the catalytically active component.

After calcining the resulting membrane it was found to have both a separating and a catalytic function.

EXAMPLES 5 and 6

Using the process of example 1 a catalytically active membrane was prepared. In a solution of 14 g silicon rubber in 125 ml ethylacetate 2.20 g ijzeracetylacetonate (example 5) and 1.70 g nickelacetylacetonate (example 6) were dissolved. After ultrasonic treatment of the solution it was applied to the same coarse-porous metallic sublayer (RVS type 316L) as described in example 1. The material was oxidised at 550° C. in air. The catalyst membrane had a high loading of catalytically active material or precursor, which was homogeneously distributed in the highly porous silica layer.

EXAMPLE 7

A cylindrical 15 cm glass tube having a glass tap at one end and a septum at the other end was filled with 5 g porous sintered metal produced by Krebsöge GmbH, Radevormwald, Germany. This sintered metal body had a BET surface below 1 m$^2$/g. The glass tube was connected to a water jet pump, and the tap of this tube was opened to remove the air in the pores of the porous body as much as possible. After evacuation of the porous body for 1 hour the tap of the glass tube was closed without leakage of air into the tube.

A solution of silicone rubber SCS 2211 of General Electric Plastics of Bergen op Zoom in ethyl acetate (130 g/l) was introduced into an injector. Subsequently, 20 ml of this solution were injected through the septum of the glass tube containing the metal body. As a result of the vacuum in the glass tube the solution was sucked into the pores of the metal. After 1 minute the septum was twisted off the glass tube. The metal body was removed from the glass tube with the excess of silicone rubber solution. The excess solution was removed by decanting, after which the porous body was air-dried at 25° C. for 2 days. Then the porous metal body was air-dried at 65° C. for 2 days. Subsequently, the sample was heated to 400° C. at a rate of 5° C./min. After calcination at 400° C. for 3 hours the sample was cooled to 20° C. at a rate of 5° C./min.

The BET surface after calcination was about 8 m$^2$/g of the assembly, approximately corresponding to about 200 m$^2$/g silica, and the thickness of the silica layer applied was found to be approximately 1 μm. Photograph 5 shows the inner side of the carrier with the silica layer applied thereon.

The resulting catalyst-precursor system was impregnated as in Example 4 with a solution of a complex solution of copper-EDTA in water, at a concentration of 100 g/l. After regeneration and oxidation carried out in the conventional manner at a temperature of about 550° C. an excellent copper catalyst on carrier was obtained.

EXAMPLE 8

A porous body of sintered metal (Krebsöge) was impregnated with a solution of a Tyzor Organic Titanate compound in isopropanol. A solution of triethanolamine titanate chelate (Tyzor TE) in isopropanol (⅓ vol/vol) or a solution of ethylaceto-acetate titanate chelate in isopropanol (⅓ vol/vol) was used for this. After impregnation the material was dried for 60 hours at room temperature in air. Subsequently the temperature was raised to 450° C. at a rate of 5° C./min. and was maintained at this temperature for 3 hours. The material was then cooled at a rate of 5° C. per minute.

Scanning elctron microscosy showed that the surface of the material was provided with a continuous layer having a thickness of about 500 nm.

In case the starting material was a porous sintered metal having on which a silica layer was deposited, a titanium dioxide layer could applied to a porous substrate of silica on metal.

We claim:

1. A catalyst or membrane precursor system comprising a thermostable, continuous high-porous layer applied to a less porous or nonporous support layer, said thermostable, continuous high-porous layer formed from a precursor of an oxide in a non-aqueous solvent.

2. A catalyst or membrane system comprising a thermostable, continuous high-porous layer applied to a less porous or nonporous support layer comprising a uniform distribution of a catalytically active material in the high porous layer, said thermostable, continuous high-porous layer formed from a precursor of an oxide in a non-aqueous solvent.

3. A system according to claim 1 or 2, obtainable by applying a precursor of a metal oxide in a non-aqueous solvent on the surface of the support layer, evaporating the solvent and calcining the metal-oxide precursor to provide said catalyst or membrane system or precursor system, comprising a thermostable, continuous, high-porous metal oxide layer applied to a less porous or non porous support layer.

4. A catalyst precursor system or catalyst system as claimed in claims 1 or 2, characterized in that the thermostable, high-porous layer is applied on the inner surface of a monolith or sintered metal body.

5. A catalyst precursor system or catalyst system as claimed in claims 1 or 2, wherein the support layer is α-Al$_2$O$_3$.

6. A catalyst precursor system or catalyst system as claimed in claims 1 or 2, wherein the support layer is a carbon carrier.

7. A catalyst precursor system or catalyst system as claimed in claims 1 or 2, wherein the support layer is a coarse-porous surface of a precursor for a ceramic membrane.

8. A catalyst or membrane precursor system or catalyst or membrane system as claimed in claims 1 or 2, characterized in that the thermostable, high-porous layer consists of a metal oxide.

9. A catalyst or membrane precursor system or catalyst or membrane system as claimed in claim 1 or claim 2, characterized in that the thermostable high-porous layer consists of silica.

10. A catalyst or membrane system comprising a thermostable, continuous high-porous layer applied to a less porous or nonporous support layer comprising a uniform distribution of a catalytically active material in the high-porous layer, said system obtainable by applying a precursor of silicon oxide in a non-aqueous solvent on the surface of the support layer, evaporating the solvent and calcining the silicon oxide precursor to provide said catalyst or membrane system or precursor system; wherein the support layer is the inner surface of a monolith or sintered metal body and selected from the group consisting of: an $\alpha$-$Al_2O_3$ material; a carbon carrier; and a coarse-porous surface of a precursor for a ceramic membrane.

11. A method of making a catalyst or membrane precursor system or catalyst or membrane system, comprising the steps of:

providing a non-aqueous solution of a suitable organic compound in a solvent;

spreading said non-aqueous solution on the surface of a support layer;

drying said non-aqueous solution to remove said solvent; and oxidizing said organic compound in an oxidizing medium to convert said organic compound into the corresponding oxide, said oxide forming a thermostable, continuous high-porous layer.

12. A method as claimed in claim 11, characterized in that the organic compound used is a polysiloxane.

13. A method as claimed in claim 11 wherein said non-aqueous solution of a suitable organic compound in a solvent is a high-viscous solution of a polysiloxane.

14. A method as claimed in claim 11 wherein said nonaqueous solution is a low-viscous polysiloxane solution, and said spreading step comprises spreading said low-viscous polysiloxane solution over the surface of a coarse-porous sublayer, the pores of said coarse-porous sublayer wholly or partly filled with a liquid having a density higher than said low-viscous polysiloxane solution.

15. The method of claim 11, wherein said nonaqueous solution of a suitable organic compound includes at least one element selected from the group consisting of boron, silicon, titanium, zirconium, cerium, scandium or yttrium.

16. The method of claim 11, wherein said spreading step includes the step of impregnation of said non-aqueous solution into said support layer.

17. A method of making a catalyst or membrane precursor system or catalyst or membrane system, comprising the steps of:

providing a high-viscous, non-aqueous solution of a polysiloxane in an anhydrous solvent;

providing a porous support layer;

spreading said high-viscous, non-aqueous solution onto a surface of said porous support layer, said spreading step including the step of impregnating said non-aqueous solution into said support layer;

drying said high viscous, non-aqueous solution to remove said solvent; and thermally oxidizing said polysiloxane in an oxidizing medium to convert said polysiloxane into the corresponding oxide, said oxide forming a thermostable, continuous high-porous layer.

18. A method of making a catalyst or membrane precursor system or catalyst or membrane system, comprising the steps of:

providing a low-viscous, non-aqueous solution of a polysiloxane in an anhydrous solvent, providing a porous support layer, the pores of said porous support layer being filled with water;

spreading said low-viscous, non-aqueous solution on the surface of said support layer, said spreading step including the step of impregnating said non-aqueous solution into said support layer;

drying said low-viscous, non-aqueous solution to remove said solvent; and thermally oxidizing said polysiloxane in an oxidizing medium to convert said polysiloxane into the corresponding oxide, said oxide forming a thermostable, continuous high-porous layer.

* * * * *

UNITED STATES PATENT AND TRADEMARK OFFICE
CERTIFICATE OF CORRECTION

PATENT NO. : 5,472,927
DATED : December 5, 1995
INVENTOR(S) : Aletta Mulder, et al.

It is certified that error appears in the above-indentified patent and that said Letters Patent is hereby corrected as shown below:

In the Abstract, line 5, "carrrier" should read --carrier--.

Column 3, line 6, "for silicon" should read --or silicon--.

Column 3, line 61, "of aluminium" should read --of α-aluminium--.

Column 4, line 26, "titaniura" should read --titanium--.

Column 6, line 33, "Chemical vapour Deposition" should read --Chemical Vapour Deposition--.

Signed and Sealed this

Sixteenth Day of July, 1996

Attest:

BRUCE LEHMAN

Attesting Officer          Commissioner of Patents and Trademarks